United States Patent
Huang

(10) Patent No.: US 12,488,226 B2
(45) Date of Patent: Dec. 2, 2025

(54) DEEP NEURAL NETWORK ACCELERATING METHOD USING RING TENSORS AND SYSTEM THEREOF, AND NON-TRANSITORY COMPUTER READABLE MEMORY

(71) Applicant: NATIONAL TSING HUA UNIVERSITY, Hsinchu (TW)

(72) Inventor: Chao-Tsung Huang, Hsinchu (TW)

(73) Assignee: NATIONAL TSING HUA UNIVERSITY, Hsinchu (TW)

( * ) Notice: Subject to any disclaimer, the term of this patent is extended or adjusted under 35 U.S.C. 154(b) by 1020 days.

(21) Appl. No.: 17/230,958

(22) Filed: Apr. 14, 2021

(65) Prior Publication Data

US 2021/0383198 A1    Dec. 9, 2021

Related U.S. Application Data

(60) Provisional application No. 63/036,976, filed on Jun. 9, 2020.

(30) Foreign Application Priority Data

Feb. 1, 2021    (TW) .................. 110103724

(51) Int. Cl.
  *G06N 3/08*    (2023.01)
  *G06N 3/048*   (2023.01)
  *G06N 3/082*   (2023.01)

(52) U.S. Cl.
  CPC .................... *G06N 3/048* (2023.01)

(58) Field of Classification Search
  CPC ......... G06N 3/048; G06N 3/045; G06N 3/063
  See application file for complete search history.

(56) References Cited

U.S. PATENT DOCUMENTS

| | | | |
|---|---|---|---|
| 2018/0285740 A1* | 10/2018 | Smyth ................. | G06N 3/084 |
| 2019/0251429 A1* | 8/2019 | Du ...................... | G06N 3/045 |
| 2020/0090049 A1* | 3/2020 | Aliper ................ | G06N 3/045 |
| 2020/0129263 A1* | 4/2020 | Izadyyazdanabadi | |
| | | | G06F 18/2413 |
| 2020/0167637 A1* | 5/2020 | Park .................... | G06F 7/44 |

(Continued)

FOREIGN PATENT DOCUMENTS

| | | |
|---|---|---|
| CN | 110399978 A | 11/2019 |
| TW | 201935329 A | 9/2019 |
| WO | 2020/060603 A1 | 3/2020 |

*Primary Examiner* — Brandon S Cole
(74) *Attorney, Agent, or Firm* — CKC & Partners Co., LLC

(57) ABSTRACT

A deep neural network accelerating method using a plurality of ring tensors includes a plurality of steps. A ring tensor setting step includes setting an input feature ring tensor and a weight ring tensor of a convolutional network. A ring tensor convolution calculating step includes calculating a plurality of input feature ring elements of the input feature ring tensor and a plurality of weight ring elements of the weight ring tensor according to a ring multiplication calculating step and a ring addition calculating step to generate a plurality of convolution feature ring elements of a convolution feature ring tensor. A non-linear tensor activation function calculating step includes executing a directional non-linear activation function on one of the convolution feature ring elements of the convolution feature ring tensor to generate an output feature ring element.

5 Claims, 8 Drawing Sheets

(56) References Cited

U.S. PATENT DOCUMENTS

| | | | |
|---|---|---|---|
| 2021/0173787 A1* | 6/2021 | Nagy | G06F 9/5027 |
| 2021/0383198 A1* | 12/2021 | Huang | G06N 3/063 |
| 2022/0121926 A1* | 4/2022 | Cheng | G06N 3/082 |

* cited by examiner

S042

S044

100c

200

DEEP NEURAL NETWORK ACCELERATING METHOD USING RING TENSORS AND SYSTEM THEREOF, AND NON-TRANSITORY COMPUTER READABLE MEMORY

RELATED APPLICATIONS

This application claims priority to U.S. Provisional Application Ser. No. 63/036,976, filed Jun. 9, 2020, and Taiwan Application Serial Number 110103724, filed Feb. 1, 2021, the disclosures of which are incorporated herein by reference in their entireties.

BACKGROUND

Technical Field

The present disclosure relates to a deep neural network accelerating method and a system thereof. More particularly, the present disclosure relates to a deep neural network accelerating method using a plurality of ring tensors and a system thereof.

Description of Related Art

Convolutional neural networks (CNN) recently draw a lot of attention for their great success in computer vision and image processing fields. Their hardware accelerators to enable edge applications also become an emerging need. However, CNN inference could demand drastically-high computing power, and, therefore, many sparsity techniques are developed to reduce such computation demands by removing unnecessary weights. However, the well-known pruning techniques, such as weight pruning, tend to generate irregular computing flow and thus cause control overheads and computation inefficiency for CNN inference, so that they are not suitable for accelerators using a large number of parallel operations.

In contrast, there are other technique directions which can provide sparsity and regularity at the same time. The other technique directions include quaternion network using quaternions, circulant convolutional neural network (CirCNN), ShuffleNet and HadaNet adopting simpler Hadamard transform. The common point of the other technique directions is to use the sparsity of the feature vector in the channel direction to regularly reduce the amount of calculation and the number of weights. In order to solve the quality loss caused by less multiplication, an additional processing is required to apply channel shuffling to mix information. The additional processing can include one of an additional linear transform between channels and a channel shuffle. The additional linear transform can obtain better quality, but increase input bitwidths of the component-wise products for fixed-point implementation and thus bring additional hardware overheads.

Therefore, a deep neural network accelerating method using a plurality of ring tensors and a system thereof having the features of effectively applying channel shuffling to mix information and achieving great image quality without increasing the input bitwidths of multiplications are commercially desirable.

SUMMARY

According to one aspect of the present disclosure, a deep neural network accelerating method using a plurality of ring tensors includes performing a ring tensor setting step, a ring tensor convolution calculating step and a non-linear tensor activation function calculating step. The ring tensor setting step includes setting an input feature ring tensor and a weight ring tensor of a convolutional network. The input feature ring tensor includes a plurality of input feature ring elements, and the weight ring tensor includes a plurality of weight ring elements. The ring tensor convolution calculating step includes calculating the input feature ring elements of the input feature ring tensor and the weight ring elements of the weight ring tensor according to a ring multiplication calculating step and a ring addition calculating step to generate a plurality of convolution feature ring elements of a convolution feature ring tensor. The non-linear tensor activation function calculating step includes executing a directional non-linear activation function on one of the convolution feature ring elements of the convolution feature ring tensor to generate an output feature ring element. The ring multiplication calculating step includes performing a ring multiplication on one of the input feature ring elements and one of the weight ring elements to generate a multiplication output ring element, and a multiplication output component of the multiplication output ring element is obtained by performing a component-wise product on an input feature component of the one of the input feature ring elements and a weight component of the one of the weight ring elements. The ring addition calculating step includes performing a ring addition on a plurality of the multiplication output ring elements to generate the one of the convolution feature ring elements, and a convolution feature component of each of the convolution feature ring elements is obtained by performing a component-wise addition on a plurality of the multiplication output components of the multiplication output ring elements.

According to another aspect of the present disclosure, a deep neural network accelerating system using a plurality of ring tensors includes a first memory, a second memory and a processing unit. The first memory is configured to an input feature ring tensor of a convolutional network. The input feature ring tensor includes a plurality of input feature ring elements. The second memory is configured to a weight ring tensor of the convolutional network. The weight ring tensor includes a plurality of weight ring elements. The processing unit is electrically connected to the first memory and the second memory. The processing unit is configured to receive the input feature ring tensor and the weight ring tensor, and implement a deep neural network accelerating method using the plurality of ring tensors includes performing a ring tensor setting step, a ring tensor convolution calculating step and a non-linear tensor activation function calculating step. The ring tensor setting step includes setting the input feature ring tensor and the weight ring tensor of the convolutional network. The ring tensor convolution calculating step includes calculating the input feature ring elements of the input feature ring tensor and the weight ring elements of the weight ring tensor according to a ring multiplication calculating step and a ring addition calculating step to generate a plurality of convolution feature ring elements of a convolution feature ring tensor. The non-linear tensor activation function calculating step includes executing a directional non-linear activation function on one of the convolution feature ring elements of the convolution feature ring tensor to generate an output feature ring element. The ring multiplication calculating step includes performing a ring multiplication on one of the input feature ring elements and one of the weight ring elements to generate a multiplication output ring element, and a multiplication output component of the multiplication output ring element is obtained by performing a component-wise product on an input feature component of the one of the input feature ring elements and a weight component of the one of the weight ring elements. The ring addition calculating step includes performing a ring addition on a plurality of the multiplication output ring elements to generate the one of the convolution feature ring elements, and a convolution feature component of each of the convolution feature ring elements is obtained by performing a component-wise addition on a plurality of the multiplication output components of the multiplication output ring elements.

BRIEF DESCRIPTION OF THE DRAWINGS

The present disclosure can be more fully understood by reading the following detailed description of the embodiment, with reference made to the accompanying drawings as follows.

DETAILED DESCRIPTION

The embodiment will be described with the drawings. For clarity, some practical details will be described below. However, it should be noted that the present disclosure should not be limited by the practical details, that is, in some embodiment, the practical details is unnecessary. In addition, for simplifying the drawings, some conventional structures and elements will be simply illustrated, and repeated elements may be represented by the same labels.

It will be understood that when an element (or device) is referred to as be "connected to" another element, it can be directly connected to the other element, or it can be indirectly connected to the other element, that is, intervening elements may be present. In contrast, when an element is referred to as be "directly connected to" another element, there are no intervening elements present. In addition, the terms first, second, third, etc. are used herein to describe various elements or components, these elements or components should not be limited by these terms. Consequently, a first element or component discussed below could be termed a second element or component.

Figure 1:
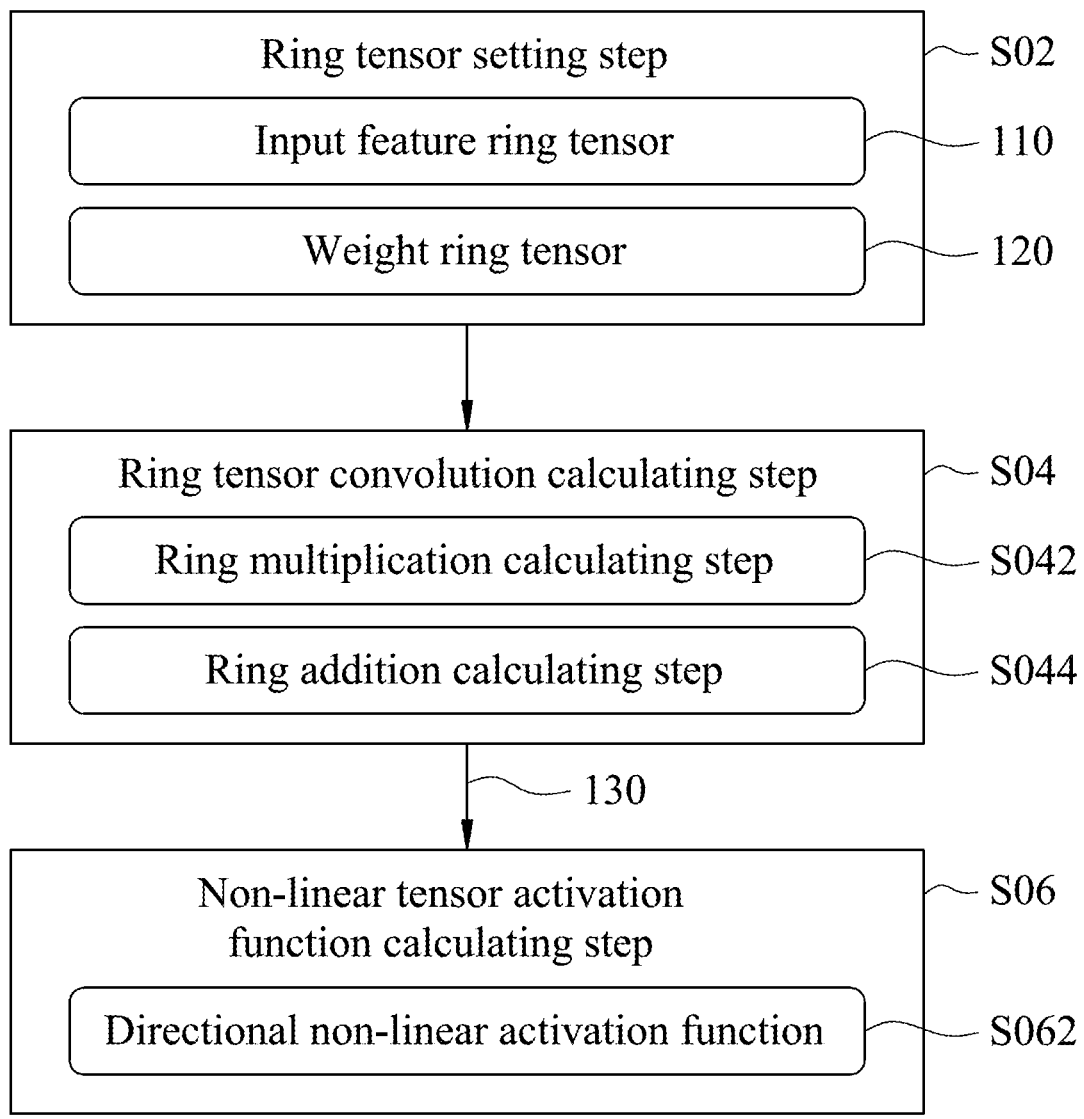
FIG. 1 shows a flow chart of a deep neural network accelerating method using a plurality of ring tensors according to a first embodiment of the present disclosure.

Please refer to FIG. 1. FIG. 1 shows a flow chart of a deep neural network accelerating method 100 using a plurality of ring tensors according to a first embodiment of the present disclosure. The deep neural network accelerating method 100 using the plurality of ring tensors includes performing a ring tensor setting step S02, a ring tensor convolution calculating step S04 and a non-linear tensor activation function calculating step S06.

The ring tensor setting step S02 includes setting an input feature ring tensor 110 and a weight ring tensor 120 of a convolutional network. The input feature ring tensor 110 includes a plurality of input feature ring elements, and the weight ring tensor 120 includes a plurality of weight ring elements. The ring tensor convolution calculating step S04 includes calculating the input feature ring elements of the input feature ring tensor 110 and the weight ring elements of the weight ring tensor 120 according to a ring multiplication calculating step S042 and a ring addition calculating step S044 to generate a plurality of convolution feature ring elements of a convolution feature ring tensor 130. The ring multiplication calculating step S042 includes performing a ring multiplication on one of the input feature ring elements and one of the weight ring elements to generate a multiplication output ring element, and a multiplication output component of the multiplication output ring element is obtained by performing a component-wise product on an input feature component of the one of the input feature ring elements and a weight component of the one of the weight ring elements. The ring addition calculating step S044 includes performing a ring addition on a plurality of the multiplication output ring elements to generate one of the convolution feature ring elements, and a convolution feature component of each of the convolution feature ring elements is obtained by performing a component-wise addition on a plurality of the multiplication output components of the multiplication output ring elements. The non-linear tensor activation function calculating step S06 includes executing a directional non-linear activation function S062 on the one of the convolution feature ring elements of the convolution feature ring tensor 130 to generate an output feature ring element. Therefore, the deep neural network accelerating method 100 using the plurality of ring tensors of the present disclosure provides a novel ring algebra which adopts the component-wise product for the ring multiplication to minimize complexity and the directional non-linear activation function S062 for ring non-linearity to achieve great image quality without increasing input bitwidths of multiplications in the ring multiplication calculating step S042, thereby avoiding the problem that the conventional method increases the input bitwidths of multiplications which lead to increased complexity.

Figure 2:
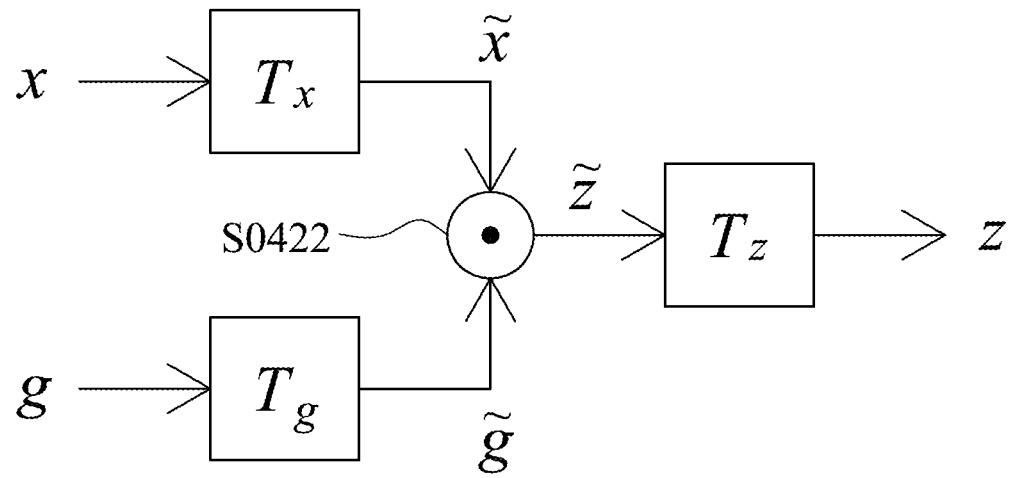
FIG. 2 shows a schematic view of a ring multiplication calculating step of the deep neural network accelerating method using the plurality of ring tensors of FIG. 1.
Figure 3:
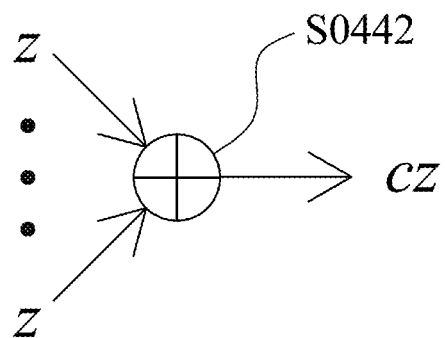
FIG. 3 shows a schematic view of a ring addition calculating step of the deep neural network accelerating method using the plurality of ring tensors of FIG. 1.
Figure 4:
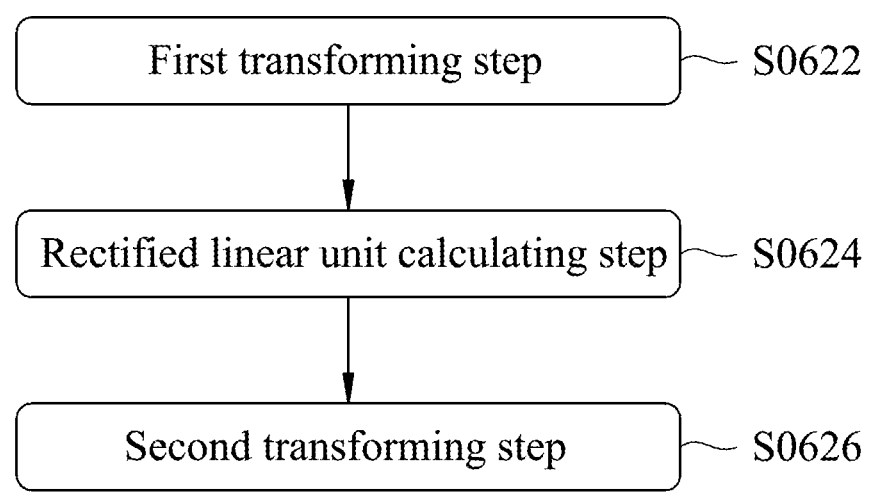
FIG. 4 shows a flow chart of a directional non-linear activation function of the deep neural network accelerating method using the plurality of ring tensors of FIG. 1.

Please refer to FIGS. 1-4. FIG. 2 shows a schematic view of a ring multiplication calculating step S042 of the deep neural network accelerating method 100 using the plurality of ring tensors of FIG. 1. FIG. 3 shows a schematic view of a ring addition calculating step S044 of the deep neural network accelerating method 100 using the plurality of ring tensors of FIG. 1. FIG. 4 shows a flow chart of a directional non-linear activation function S062 of the deep neural network accelerating method 100 using the plurality of ring tensors of FIG. 1. The deep neural network accelerating method 100 using the plurality of ring tensors includes performing a ring tensor setting step S02, a ring tensor convolution calculating step S04 and a non-linear tensor activation function calculating step S06.

The ring tensor setting step S02 includes setting an input feature ring tensor 110 and a weight ring tensor 120 of a convolutional network. The input feature ring tensor 110 includes a plurality of input feature ring elements x, and the weight ring tensor 120 includes a plurality of weight ring elements g. The ring tensor is a multi-dimensional array and may be a ring vector or a ring matrix. The ring element is an n-dimensional real vector, and n is a positive integer greater than or equal to 2. The input feature ring element x includes a plurality of input feature components $x_i$, and i is an integer greater than or equal to 0. The weight ring element g includes a plurality of weight components $g_i$. Each of the input feature components $x_i$ and the weight components $g_i$ is a real value.

The ring tensor convolution calculating step S04 includes calculating the input feature ring elements x of the input feature ring tensor 110 and the weight ring elements g of the weight ring tensor 120 according to the ring multiplication calculating step S042 and the ring addition calculating step S044 to generate a plurality of convolution feature ring elements cz of a convolution feature ring tensor 130. The convolution feature ring elements cz include a plurality of convolution feature components $cz_1$.

The ring multiplication calculating step S042 includes performing a ring multiplication on one of the input feature ring elements x and one of the weight ring elements g to generate a multiplication output ring element z, and a multiplication output component $z_i$ of the multiplication output ring element z is obtained by performing a component-wise product S0422 on an input feature component $x_i$ of the one of the input feature ring elements x and a weight component $g_i$ of the one of the weight ring elements g, as shown in FIG. 2. In detail, the ring multiplication calculating step S042 includes transforming one of the input feature ring elements x and one of the weight ring elements g by an input feature transform matrix $T_x$ and a weight transform matrix $T_g$ to generate an input feature transform output $\tilde{x}$ and a weight transform output $\tilde{g}$, respectively, and then performing the component-wise product S0422 on the input feature transform output $\tilde{x}$ and the weight transform output $\tilde{g}$ to generate a multiplication output $\tilde{z}$, and finally transforming the multiplication output $\tilde{z}$ by an multiplication output transform matrix $T_z$ to generate the multiplication output ring element z. In the embodiment, each of the input feature transform matrix $T_x$, the weight transform matrix $T_g$ and the multiplication output transform matrix $T_z$ is an identity matrix. The relationship between the multiplication output ring elements z and the input feature ring elements x can be described as follows:

$$z = Gx \qquad (1).$$

Wherein G represents an isomorphic matrix, and the isomorphic matrix G is associated with the weight components $g_i$.

The ring addition calculating step S044 includes performing a ring addition on a plurality of the multiplication output ring elements z to generate one of the convolution feature ring elements cz, and a convolution feature component $cz_j$ of each of the convolution feature ring elements cz is obtained by performing a component-wise addition S0442 on a plurality of the multiplication output components $z_i$ of the multiplication output ring elements $z_i$ as shown in FIG. 3.

The non-linear tensor activation function calculating step S06 includes executing a directional non-linear activation function S062 on the one of the convolution feature ring elements cz of the convolution feature ring tensor 130 to generate an output feature ring element $f_{dir}(cz)$. In detail, the directional non-linear activation function S062 includes performing a first transforming step S0622, a rectified linear unit calculating step S0624 and a second transforming step S0626. The first transforming step S0622 includes performing a first linear transform V on the one of the convolution feature ring elements cz to generate a linear output ring element Vcz. The rectified linear unit calculating step S0624 includes performing a component-wise rectified linear unit $f_{cw}$ (component-wise ReLU) on the linear output ring element Vcz to generate a rectified linear output ring element $f_{cw}(Vcz)$. The second transforming step S0626 includes performing a second linear transform U on the rectified linear output ring element $f_{cw}(Vcz)$ to generate the output feature ring element $f_{dir}(cz)$. In addition, the ring tensor setting step S02, the ring tensor convolution calculating step S04 and the non-linear tensor activation function calculating step S06 are performed in sequence. The first transforming step S0622, the rectified linear unit calculating step S0624 and the second transforming step S0626 are performed in sequence. The component-wise ReLU $f_{cw}$ and the output feature ring element $f_{dir}(cz)$ can be described as follows:

$$f_{cw}(y) = (\max(0, y_0), \ldots, \max(0, y_{n-1}))^t \qquad (2).$$

$$f_{dir}(cz) = U f_{cw}(Vcz) \qquad (3).$$

Wherein y represents a ring element. $y_0$-$y_{n-1}$ represent a plurality of components $y_i$ of the ring element where i is 0 to n−1. In the embodiment, each of the first linear transform V and the second linear transform U is a Hadamard transform H. The output feature ring element corresponding to the embodiment can be represented by "$f_H(cz)$" and described as follows:

$$f_H(cz) = H f_{cw}(Hcz) \qquad (4).$$

Accordingly, the deep neural network accelerating method 100 using the plurality of ring tensors of the present disclosure provides a novel ring algebra which adopts the component-wise product for the ring multiplication and executes the first linear transform V and the second linear transform U in the directional non-linear activation function S062 for ring non-linearity, so that the input bitwidths of multiplications in the ring multiplication calculating step S042 are not increased. In addition, the present disclosure can effectively apply channel shuffling to mix information and achieve best image quality in ring algebras.

Figure 5:
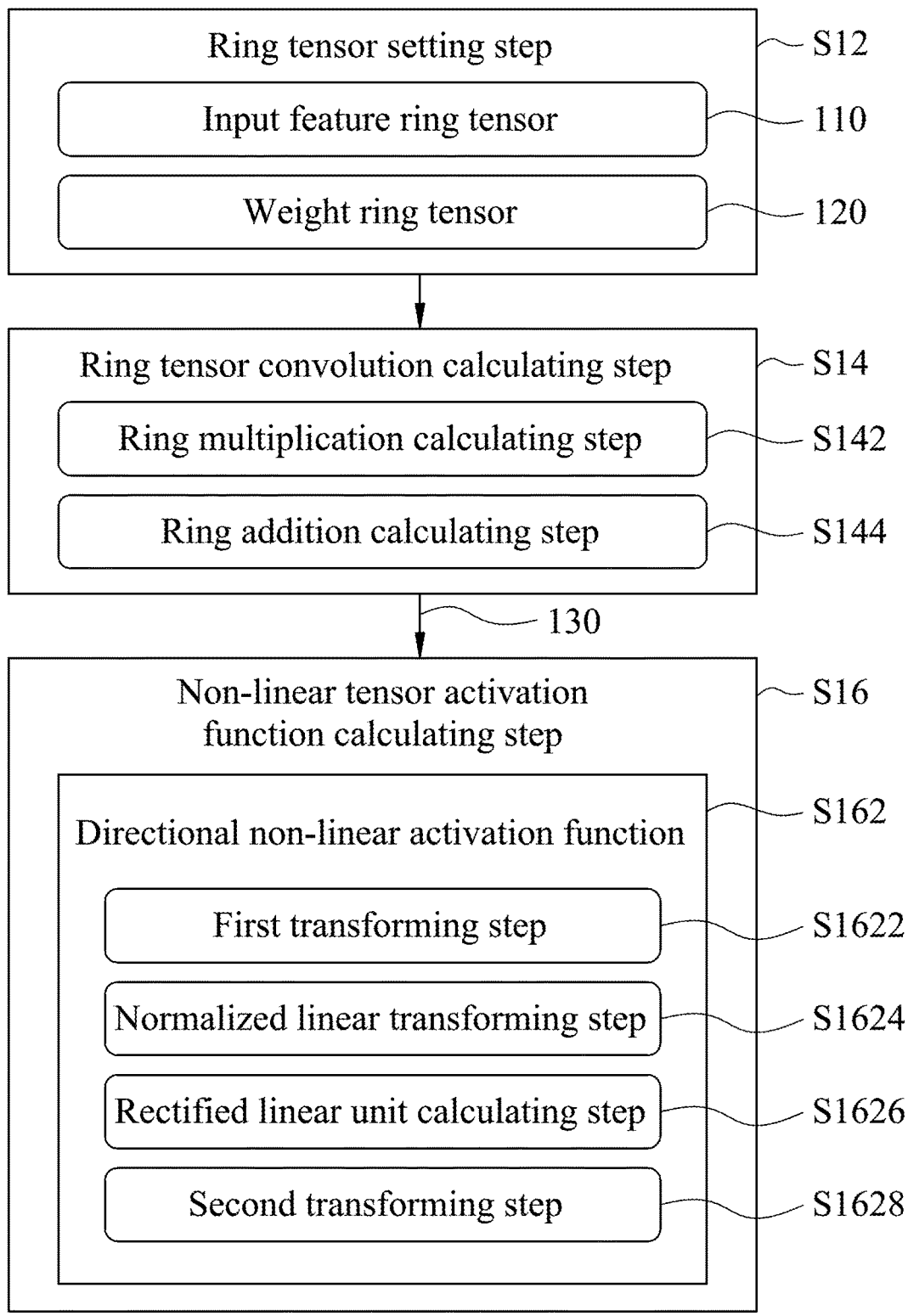
FIG. 5 shows a flow chart of a deep neural network accelerating method using a plurality of ring tensors according to a second embodiment of the present disclosure.

Please refer to FIGS. 1-5. FIG. 5 shows a flow chart of a deep neural network accelerating method 100a using a plurality of ring tensors according to a second embodiment of the present disclosure. The deep neural network accelerating method 100a using the plurality of ring tensors includes performing a ring tensor setting step S12, a ring tensor convolution calculating step S14 and a non-linear tensor activation function calculating step S16. The ring tensor setting step S12 includes setting an input feature ring tensor 110 and a weight ring tensor 120 of a convolutional network. The ring tensor convolution calculating step S14 includes performing a ring multiplication calculating step S142 and a ring addition calculating step S144. The detail of the ring tensor setting step S12 and the ring tensor convolution calculating step S14 is the same as the embodiment of the ring tensor setting step S02 and the ring tensor convolution calculating step S04 of FIG. 1, and will not be described again herein. In FIG. 5, the non-linear tensor activation function calculating step S16 includes executing a directional non-linear activation function S162 on the one of the convolution feature ring elements cz of the convolution feature ring tensor 130 to generate an output feature ring element $f_{dir}(cz)$. The directional non-linear activation function S162 includes performing a first transforming step S1622, a normalized linear transforming step S1624, a rectified linear unit calculating step S1626 and a second transforming step S1628. The first transforming step S1622 includes performing a first linear transform V on the one of the convolution feature ring elements cz to generate a first linear output ring element Vcz. The normalized linear transforming step S1624 includes performing the ring multiplication (that is the same as the ring multiplication of the ring multiplication calculating step S042 of FIG. 2) on the first linear output ring element Vcz and a normalized linear transform T to generate a second linear output ring element TVcz. The rectified linear unit calculating step S1626 includes performing a component-wise ReLU $f_{cw}$ on the second linear output ring element TVcz to generate a rectified linear output ring element $f_{cw}$(TVcz). The second transforming step S1628 includes performing a second linear transform U on the rectified linear output ring element $f_{cw}$(TVcz) to generate the output feature ring element $f_{dir}$(cz). In the embodiment, each of the first linear transform V and the second linear transform U is a Hadamard transform H. The normalized linear transform T can be a normalized diagonal matrix for normalizing the components of the ring elements, but the present disclosure is not limited thereto. Hence, the deep neural network accelerating method 100a using the plurality of ring tensors of the present disclosure provides a novel ring algebra which adopts the normalized linear transform T for the required transformation and executes the first linear transform V and the second linear transform U in the directional non-linear activation function S162 for ring non-linearity, so that the input bitwidths of multiplications in the ring multiplication calculating step S142 are not increased. In addition, the present disclosure can effectively apply channel shuffling to mix information and achieve best image quality in ring algebras.

Figure 6:
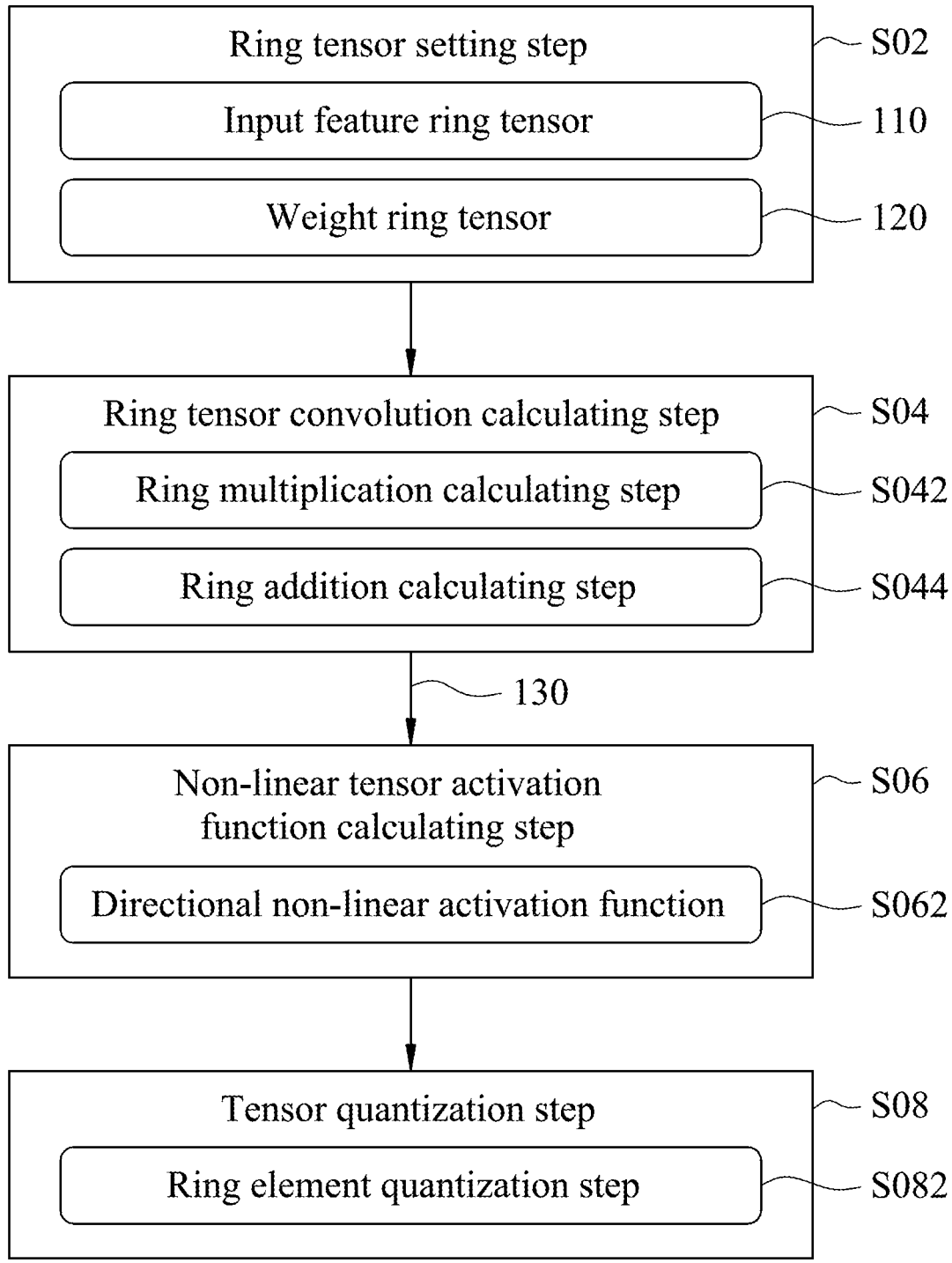
FIG. 6 shows a flow chart of a deep neural network accelerating method using a plurality of ring tensors according to a third embodiment of the present disclosure.

Please refer to FIGS. 1-4 and 6. FIG. 6 shows a flow chart of a deep neural network accelerating method 100b using a plurality of ring tensors according to a third embodiment of the present disclosure. The deep neural network accelerating method 100b using the plurality of ring tensors includes performing a ring tensor setting step S02, a ring tensor convolution calculating step S04, a non-linear tensor activation function calculating step S06 and a tensor quantization step S08. The detail of the ring tensor setting step S02, the ring tensor convolution calculating step S04 and the non-linear tensor activation function calculating step S06 is the same as the embodiment of the ring tensor setting step S02, the ring tensor convolution calculating step S04 and the non-linear tensor activation function calculating step S06 of FIG. 1, and will not be described again herein. In FIG. 6, the deep neural network accelerating method 100b using the plurality of ring tensors further includes the tensor quantization step S08. The tensor quantization step S08 includes a ring element quantization step S082. The ring element quantization step S082 includes performing a quantization operation Q on the output feature ring element $f_{dir}$(cz) to generate a quantized output ring element Q(cz). The ring tensor setting step S02, the ring tensor convolution calculating step S04, the non-linear tensor activation function calculating step S06 and the tensor quantization step S08 are performed in sequence. Therefore, the deep neural network accelerating method 100b using the plurality of ring tensors of the present disclosure can quantize the output feature ring element $f_{dir}$(cz) generated by the non-linear tensor activation function calculating step S06 so as to obtain an output feature with a target bit number.

Figure 7:
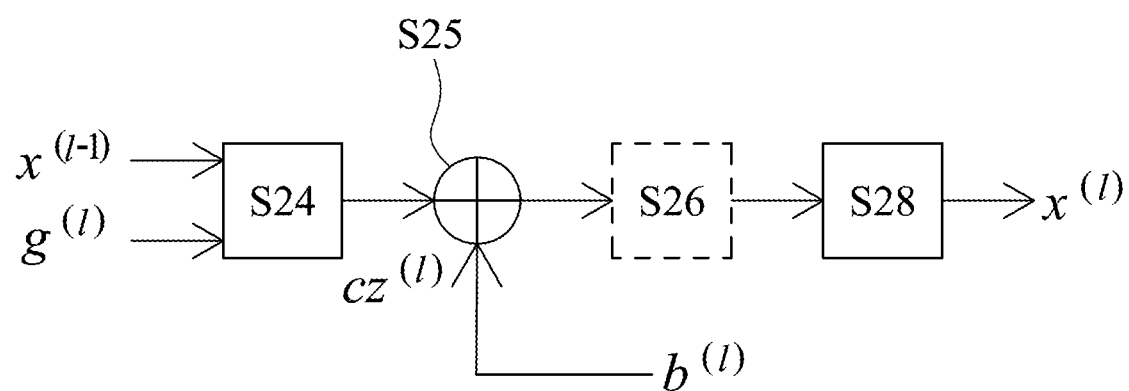
FIG. 7 shows a schematic view of a convolution layer of a deep neural network accelerating method using a plurality of ring tensors according to a fourth embodiment of the present disclosure.

Please refer to FIGS. 1, 6 and 7. FIG. 7 shows a schematic view of a convolution layer of a deep neural network accelerating method 100c using a plurality of ring tensors according to a fourth embodiment of the present disclosure. The deep neural network accelerating method 100c using the plurality of ring tensors includes performing a ring tensor convolution calculating step S24, a bias tensor adding step S25, a non-linear tensor activation function calculating step S26 and a tensor quantization step S28. The ring tensor convolution calculating step S24 includes calculating an input feature ring tensor $x^{(l-1)}$ and a weight ring tensor $g^{(l)}$ according to a ring multiplication calculating step (that is the same as the ring multiplication calculating step S042 of FIG. 1) and a ring addition calculating step (that is the same as the ring addition calculating step S044 of FIG. 1) to generate a plurality of convolution feature ring tensors $cz^{(l)}$. l represents an l-th layer. The bias tensor adding step S25 includes adding a bias ring tensor $b^{(l)}$ to the convolution feature ring tensor $cz^{(l)}$ to generate a biased convolution feature ring tensor $cz^{(l)}$, and then transmitting the biased convolution feature ring tensor $cz^{(l)}$ to the non-linear tensor activation function calculating step S26. After performing the non-linear tensor activation function calculating step S26 and the tensor quantization step S28, the quantized output ring element Q(cz) generated by the tensor quantization step S28 is regarded as the input feature ring element of the input feature ring tensor $x^{(l)}$ of the next layer. In another embodiment, the number of the biased convolution feature ring tensors $cz^{(l)}$ that are inputted to the non-linear tensor activation function calculating step S26 can be determined according to model structures. In other words, not all of the biased convolution feature ring tensors $cz^{(l)}$ are inputted to the non-linear tensor activation function calculating step S26, i.e., the non-linear tensor activation function calculating step S26 may appear or not (dash line) based on the model structures. Therefore, the convolution layer of the deep neural network accelerating method 100c using the plurality of ring tensors of the present disclosure can adjust the convolution feature ring tensor $cz^{(l)}$ of the ring tensor convolution calculating step S24 according to the bias ring tensor $b^{(l)}$ so as to obtain a desired output feature.

Figure 8:
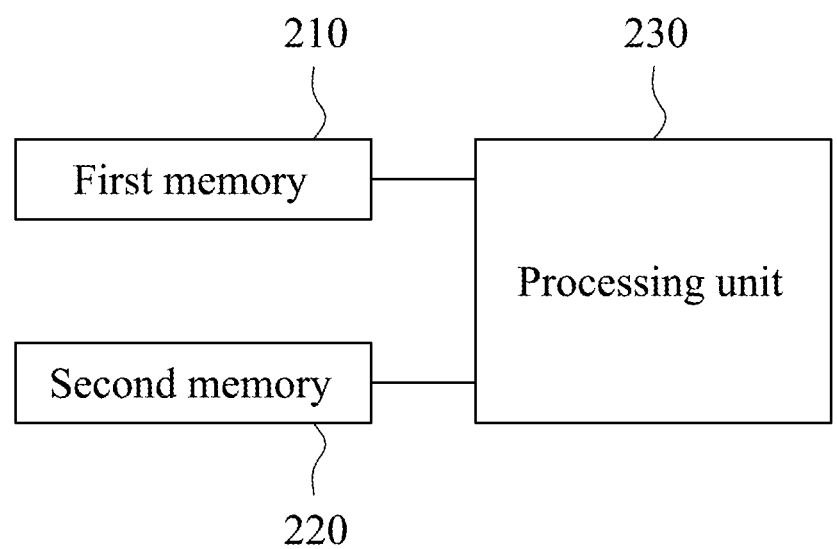
FIG. 8 shows a block diagram of a deep neural network accelerating system using a plurality of ring tensors according to a fifth embodiment of the present disclosure.

Please refer to FIGS. 1-8. FIG. 8 shows a block diagram of a deep neural network accelerating system 200 using a plurality of ring tensors according to a fifth embodiment of the present disclosure. The deep neural network accelerating system 200 using the plurality of ring tensors includes a first memory 210, a second memory 220 and a processing unit 230.

The first memory 210 is configured to an input feature ring tensor 110 of a convolutional network. The input feature ring tensor 110 includes a plurality of input feature ring elements x. The second memory 220 is configured to a weight ring tensor 120 of the convolutional network. The weight ring tensor 120 includes a plurality of weight ring elements g.

The processing unit 230 is electrically connected to the first memory 210 and the second memory 220. The processing unit 230 is configured to receive the input feature ring tensor 110 and the weight ring tensor 120, and implement a deep neural network accelerating method 100 using the plurality of ring tensors including a ring tensor setting step S02, a ring tensor convolution calculating step S04 and a non-linear tensor activation function calculating step S06, as shown in FIG. 1. The processing unit 230 may be a microprocessor, a central processing unit or an image processor, but the present disclosure is not limited thereto. In other embodiments, the processing unit 230 can be configured to implement the deep neural network accelerating method 100a using the plurality of ring tensors of FIG. 5, the deep neural network accelerating method 100b using the plurality of ring tensors of FIG. 6 and the deep neural network accelerating method 100c using the plurality of ring tensors of FIG. 7.

Accordingly, the deep neural network accelerating system 200 using the plurality of ring tensors of the present disclosure provides a novel ring algebra which adopts the component-wise product for the ring multiplication and executes linear transforms in the directional non-linear activation functions S062, S162 for ring non-linearity, so that the input bitwidths of multiplications in the ring multiplication calculating step S042 are not increased. In addition, the present disclosure can effectively apply channel shuffling to mix information and achieve best image quality in ring algebras.

Figure 9:
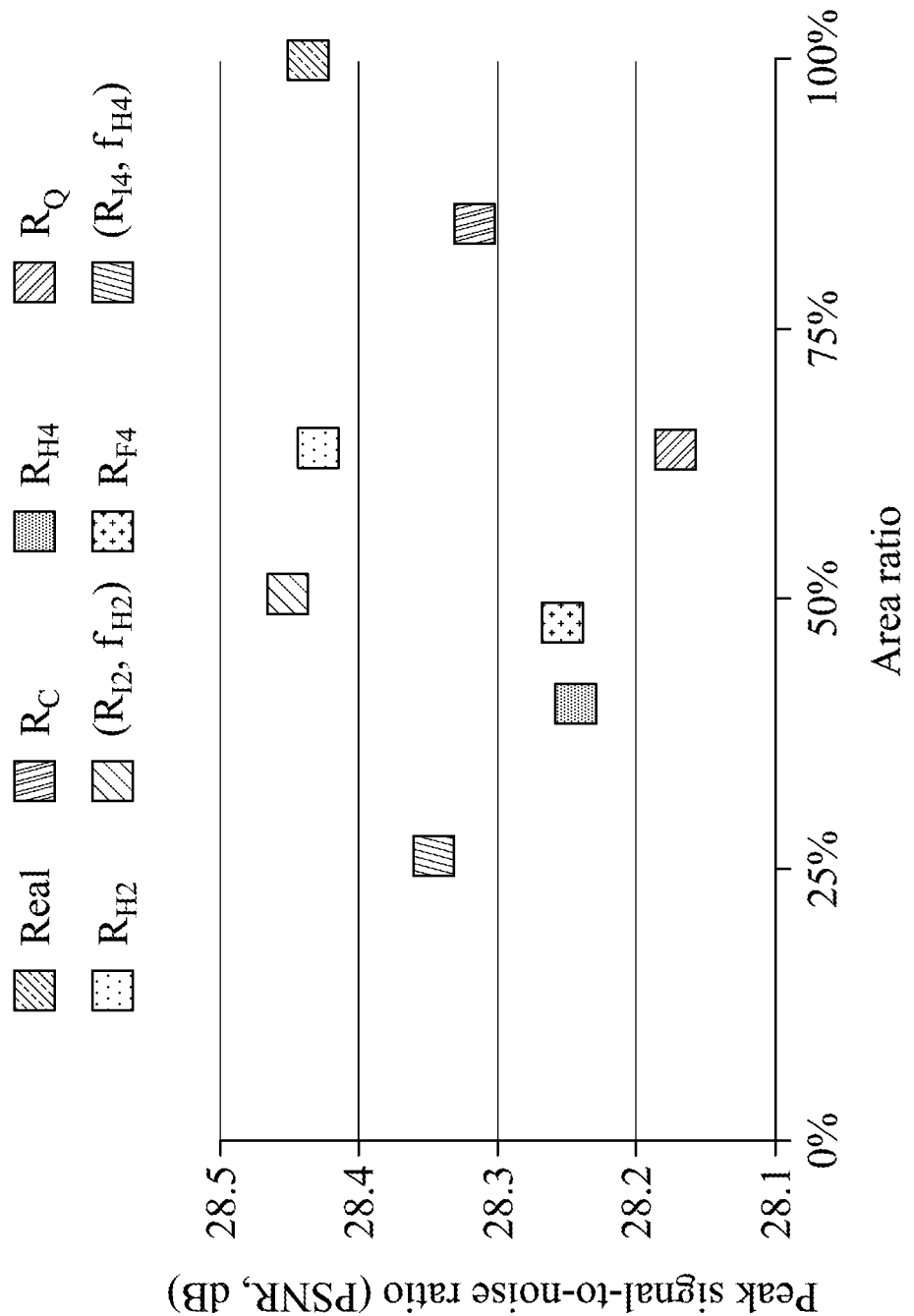
FIG. 9 shows a schematic view of a comparison result of a plurality of conventional methods and the deep neural network accelerating methods using the plurality of ring tensors of the present disclosure.

Please refer to Tables 1-3 and FIG. 9. Table 1 lists characteristics of ring algebras for ring dimension D=2. Table 2 lists one part of characteristics of ring algebras for ring dimension D=4. Table 3 lists another part of characteristics of ring algebras for ring dimension D=4. FIG. 9 shows a schematic view of a comparison result of a plurality of conventional methods and the deep neural network accelerating methods using the plurality of ring tensors of the present disclosure. The symbol Real represents a convolution operation and an activation function operation of original real values. The symbols $R_{H2}$, $R_{H4}$ represent that an input feature transform matrix $T_x$ and a weight transform matrix $T_g$ are Hadamard transforms $H_2$, $H_4$, respectively. The Hadamard transforms $H_2$, $H_4$ are described as follows:

$$H_2 = \begin{pmatrix} 1 & 1 \\ 1 & -1 \end{pmatrix}. \tag{5}$$

$$H_4 = \begin{pmatrix} H_2 & H_2 \\ H_2 & -H_2 \end{pmatrix}. \tag{6}$$

The symbol $R_C$ represents that an isomorphic matrix G is a 2×2 rotation matrix, and the input feature transform matrix $T_x$ and the weight transform matrix $T_g$ are derived from a complex multiplication algorithm. The symbols $R_{12}$, $R_{14}$ represent that the isomorphic matrix G uses the component-wise product, and the input feature transform matrix $T_x$ and the weight transform matrix $T_g$ are the identity matrixes. The symbol $R_{F4}$ represents that the isomorphic matrix G uses circular convolution, and the input feature transform matrix $T_x$ and the weight transform matrix $T_g$ are derived from Fourier transform. The symbol $R_Q$ represents that the isomorphic matrix G uses Hamilton product and equals to the quaternion. The symbols $R_{H2}$, $R_C$, $R_{12}$, $R_{H4}$, $R_{F4}$, $R_Q$, $R_{14}$ are conventional techniques, and each of the non-linearity operations f of the conventional techniques is the component-wise ReLU $f_{cw}$. The symbols ($R_{12}$,$f_{H2}$), ($R_{14}$,$f_{H4}$) are the present disclosure, and the non-linearity operations f of the present disclosure are the directional non-linear activation functions $f_{H2}(x)$, $f_{H4}(x)$. The comparison result of FIG. 9 is evaluated on four-times super-resolution (SR×4) networks SR4ERNet (SR4ERNet-B17R3N1). In Tables 1-3 and FIG. 9, compared with the conventional ring algebras, the present disclosure corresponding to the symbols ($R_{12}$, $f_{H2}$), ($R_{14}$,$f_{H4}$) devises a novel ring algebra which minimizes complexity with the component-wise product (i.e., minimum hardware resource ratio and minimum area ratio) and achieves the best quality using the directional non-linear activation function (i.e., maximum peak signal-to-noise ratio (PSNR)) without increasing the input bitwidths of multiplications.

TABLE 1

| Ring Algebra | Dimension Symbol Multiplicative Identity | D = 2 | | |
|---|---|---|---|---|
| | | $R_{H2}$ | $R_C$ | $R_{12}$ ($R_{12}$,$f_{H2}$) |
| | | $(1\ 0)^t$ | | $(1\ 1)^t$ |
| | Isomorphic Matrix G | $\begin{pmatrix} g_0 & g_1 \\ g_1 & g_0 \end{pmatrix}$ | $\begin{pmatrix} g_0 & -g_1 \\ g_1 & g_0 \end{pmatrix}$ | $\begin{pmatrix} g_0 & 0 \\ 0 & g_1 \end{pmatrix}$ |
| | Non-Linearity Operation f | | $f_{cw}$ | $f_{H2}(x)$ |
| Ring Multiplication | $T_x$, $T_g$ | $H_2$ | $\left(H_2 \Big\vert \begin{matrix} 0 \\ 1 \end{matrix}\right)^t$ | $I_2$ |
| | $T_z$ | $H_2^{-1} = \dfrac{H_2}{2}$ | $\left(\dfrac{H_2}{2} \Big\vert \begin{matrix} -1 \\ 0 \end{matrix}\right)$ | $I_2$ |
| | Number of Real-Valued Multiplications | 2 | 3 | 2 |
| Hardware Resource Ratio | Number of Weights | | 50% | |
| | Number of Multiplication | 50% | 75% | 50% |
| | Complexity | 63% | 88% | 50% |

TABLE 2

| Ring Algebra | Dimension Symbol Multiplicative Identity | D = 4 | |
|---|---|---|---|
| | | $R_{H4}$ | $R_{F4}$ |
| | | $(1\ 0\ 0\ 0)^t$ | |
| | Isomorphic Matrix G | $\begin{pmatrix} g_0 & g_1 & g_2 & g_3 \\ g_1 & g_0 & g_3 & g_2 \\ g_2 & g_3 & g_0 & g_1 \\ g_3 & g_2 & g_1 & g_0 \end{pmatrix}$ | $\begin{pmatrix} g_0 & g_3 & g_2 & g_1 \\ g_1 & g_0 & g_3 & g_2 \\ g_2 & g_1 & g_0 & g_3 \\ g_3 & g_2 & g_1 & g_0 \end{pmatrix}$ |
| | Non-Linearity Operation f | | $f_{cw}$ |
| Ring Multiplication | $T_x$, $T_g$ | $H_4$ | $\left(H_4 \Big\vert \begin{matrix} 0 \\ 1 \\ 0 \\ -1 \end{matrix}\right)^t$ |
| | $T_z$ | $H_4^{-1} = \dfrac{H_4}{4}$ | $\left(\dfrac{H_4}{4} \Big\vert \begin{matrix} -1 \\ 0 \\ 1 \\ 0 \end{matrix}\right)$ |
| | Number of Real-Valued Multiplications | 4 | 5 |
| Hardware Resource Ratio | Number of Weights | | 25% |
| | Number of Multiplication | 25% | 31% |
| | Complexity | 39% | 47% |

TABLE 3

| Ring Algebra | Dimension | D = 4 | |
|---|---|---|---|
| | Symbol | $R_Q$ | $R_{I4}$ ($R_{I4}$, $f_{H4}$) |
| | Multiplicative Identity | $(1\ 0\ 0\ 0)^t$ | $(1\ 1\ 1\ 1)^t$ |
| | Isomorphic Matrix G | $\begin{pmatrix} g_0 & -g_1 & -g_2 & -g_3 \\ g_1 & g_0 & g_3 & -g_2 \\ g_2 & -g_3 & g_0 & g_1 \\ g_3 & g_2 & -g_1 & g_0 \end{pmatrix}$ | $\begin{pmatrix} g_0 & 0 & 0 & 0 \\ 0 & g_1 & 0 & 0 \\ 0 & 0 & g_2 & 0 \\ 0 & 0 & 0 & g_3 \end{pmatrix}$ |
| | Non-Linearity Operation f | $f_{cw}$ | $f_{H4}(x)$ |
| Ring Multiplication | $T_x, T_g$ | $\left( H_4 \begin{vmatrix} 1 & 0 & 0 & 0 \\ 0 & 0 & 0 & 1 \\ 0 & 1 & 0 & 0 \\ 0 & 0 & 1 & 0 \end{vmatrix} \right)^t$ | $I_4$ |
| | $T_z$ | $\begin{pmatrix} -1 & 0 & 0 & 0 \\ 0 & 1 & 0 & 0 \\ 0 & 0 & 1 & 0 \\ 0 & 0 & 0 & 1 \end{pmatrix} \left( \frac{H_4}{4} \middle| -2I_4 \right)$ | $I_4$ |
| | Number of Real-Valued Multiplications | 8 | 4 |
| Hardware Resource Ratio | Number of Weights | | 25% |
| | Number of Multiplication | 50% | 25% |
| | Complexity | 64% | 25% |

According to the aforementioned embodiments and examples, the advantages of the present disclosure are described as follows.

1. The deep neural network accelerating method using the plurality of ring tensors and the system thereof of the present disclosure provides a novel ring algebra which adopts the component-wise product for the ring multiplication to minimize complexity and the directional non-linear activation function for ring non-linearity to achieve great image quality without increasing the input bitwidths of multiplications in the ring multiplication calculating step, thereby avoiding the problem that the conventional method increases the input bitwidths of multiplications which lead to increased complexity.

2. The deep neural network accelerating method using the plurality of ring tensors and the system thereof of the present disclosure provide a novel ring algebra which adopts the component-wise product for the ring multiplication and executes linear transforms in the directional non-linear activation functions for ring non-linearity, so that the input bitwidths of multiplications in the ring multiplication calculating step are not increased.

3. The deep neural network accelerating method using the plurality of ring tensors and the system thereof of the present disclosure can effectively apply channel shuffling to mix information and achieve best image quality in ring algebras.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A deep neural network accelerating method using a plurality of ring tensors, comprising:

performing a ring tensor setting step, wherein the ring tensor setting step comprises setting an input feature ring tensor and a weight ring tensor of a convolutional network, the input feature ring tensor comprises a plurality of input feature ring elements, and the weight ring tensor comprises a plurality of weight ring elements;

performing a ring tensor convolution calculating step, wherein the ring tensor convolution calculating step comprises calculating the input feature ring elements of the input feature ring tensor and the weight ring elements of the weight ring tensor according to a ring multiplication calculating step and a ring addition calculating step to generate a plurality of convolution feature ring elements of a convolution feature ring tensor; and performing a non-linear tensor activation function calculating step, wherein the non-linear tensor activation function calculating step comprises executing a directional non-linear activation function on one of the convolution feature ring elements of the convolution feature ring tensor to generate an output feature ring element;

wherein the ring multiplication calculating step comprises performing a ring multiplication on one of the input feature ring elements and one of the weight ring elements to generate a multiplication output ring element, and a multiplication output component of the multiplication output ring element is obtained by performing a component-wise product on an input feature component of the one of the input feature ring elements and a weight component of the one of the weight ring elements;

wherein the ring addition calculating step comprises performing a ring addition on a plurality of the multiplication output ring elements to generate the one of the convolution feature ring elements, and a convolution feature component of each of the convolution feature ring elements is obtained by performing a component-wise addition on a plurality of the multiplication output components of the multiplication output ring elements;

wherein the deep neural network accelerating method using the plurality of ring tensors is performed to process an image without increasing input bitwidths of multiplications in the ring multiplication calculating step and to minimize complexity with the component-wise product when processing the image by a processing unit;

wherein the directional non-linear activation function comprises:

performing a first transforming step, wherein the first transforming step comprises performing a first linear transform on the one of the convolution feature ring elements to generate a first linear output ring element;

performing a normalized linear transforming step, wherein the normalized linear transforming step comprises performing the ring multiplication on the first linear output ring element and a normalized linear transform to generate a second linear output ring element;

performing a rectified linear unit calculating step, wherein the rectified linear unit calculating step comprises performing a component-wise rectified linear unit on the second linear output ring element to generate a rectified linear output ring element; and performing a second transforming step, wherein the second transforming step comprises performing a second linear transform on the rectified linear output ring element to generate the output feature ring element;

wherein each of the first linear transform and the second linear transform is a Hadamard transform, and the first transforming step, the normalized linear transforming step, the rectified linear unit calculating step and the second transforming step are performed in sequence;

wherein the deep neural network accelerating method using the plurality of ring tensors further comprises:

performing a tensor quantization step, wherein the tensor quantization step comprises performing a quantization operation on the output feature ring element to generate a quantized output ring element;

wherein after performing the tensor quantization step, the quantized output ring element generated by the tensor quantization step is regarded as the input feature ring element of the input feature ring tensor of a next layer.

2. The deep neural network accelerating method using the plurality of ring tensors of claim 1, wherein the ring tensor setting step, the ring tensor convolution calculating step, the non-linear tensor activation function calculating step and the tensor quantization step are performed in sequence.

3. A deep neural network accelerating system using a plurality of ring tensors, comprising:

a first memory configured to an input feature ring tensor of a convolutional network, wherein the input feature ring tensor comprises a plurality of input feature ring elements;

a second memory configured to a weight ring tensor of the convolutional network, wherein the weight ring tensor comprises a plurality of weight ring elements; and a processing unit electrically connected to the first memory and the second memory, wherein the processing unit is configured to receive the input feature ring tensor and the weight ring tensor, and implement a deep neural network accelerating method using the plurality of ring tensors comprising:

performing a ring tensor setting step, wherein the ring tensor setting step comprises setting the input feature ring tensor and the weight ring tensor of the convolutional network;

performing a ring tensor convolution calculating step, wherein the ring tensor convolution calculating step comprises calculating the input feature ring elements of the input feature ring tensor and the weight ring elements of the weight ring tensor according to a ring multiplication calculating step and a ring addition calculating step to generate a plurality of convolution feature ring elements of a convolution feature ring tensor; and performing a non-linear tensor activation function calculating step, wherein the non-linear tensor activation function calculating step comprises executing a directional non-linear activation function on one of the convolution feature ring elements of the convolution feature ring tensor to generate an output feature ring element;

wherein the ring multiplication calculating step comprises performing a ring multiplication on one of the input feature ring elements and one of the weight ring elements to generate a multiplication output ring element, and a multiplication output component of the multiplication output ring element is obtained by performing a component-wise product on an input feature component of the one of the input feature ring elements and a weight component of the one of the weight ring elements;

wherein the ring addition calculating step comprises performing a ring addition on a plurality of the multiplication output ring elements to generate the one of the convolution feature ring elements, and a convolution feature component of each of the convolution feature ring elements is obtained by performing a component-wise addition on a plurality of the multiplication output components of the multiplication output ring elements;

wherein the deep neural network accelerating method using the plurality of ring tensors is performed to process an image without increasing input bitwidths of multiplications in the ring multiplication calculating step and to minimize complexity with the component-wise product when processing the image by the processing unit;

wherein the directional non-linear activation function comprises:

performing a first transforming step, wherein the first transforming step comprises performing a first linear transform on the one of the convolution feature ring elements to generate a first linear output ring element;

performing a normalized linear transforming step, wherein the normalized linear transforming step comprises performing the ring multiplication on the first linear output ring element and a normalized linear transform to generate a second linear output ring element;

performing a rectified linear unit calculating step, wherein the rectified linear unit calculating step comprises performing a component-wise rectified linear unit on the second linear output ring element to generate a rectified linear output ring element; and performing a second transforming step, wherein the second transforming step comprises performing a second linear transform on the rectified linear output ring element to generate the output feature ring element;

wherein each of the first linear transform and the second linear transform is a Hadamard transform, and the first transforming step, the normalized linear transforming step, the rectified linear unit calculating step and the second transforming step are performed in sequence;

wherein the deep neural network accelerating method using the plurality of ring tensors further comprises:

performing a tensor quantization step, wherein the tensor quantization step comprises performing a quantization operation on the output feature ring element to generate a quantized output ring element;

wherein after performing the tensor quantization step, the quantized output ring element generated by the tensor quantization step is regarded as the input feature ring element of the input feature ring tensor of a next layer.

4. The deep neural network accelerating system using the plurality of ring tensors of claim 3, wherein the ring tensor setting step, the ring tensor convolution calculating step, the non-linear tensor activation function calculating step and the tensor quantization step are performed in sequence.

5. A non-transitory computer readable memory storing instructions which when executed by a processing unit configured to perform a deep neural network accelerating method using a plurality of ring tensors comprising:

performing a ring tensor setting step, wherein the ring tensor setting step comprises setting an input feature ring tensor and a weight ring tensor of a convolutional network, the input feature ring tensor comprises a plurality of input feature ring elements, and the weight ring tensor comprises a plurality of weight ring elements;

performing a ring tensor convolution calculating step, wherein the ring tensor convolution calculating step comprises calculating the input feature ring elements of the input feature ring tensor and the weight ring elements of the weight ring tensor according to a ring multiplication calculating step and a ring addition calculating step to generate a plurality of convolution feature ring elements of a convolution feature ring tensor; and performing a non-linear tensor activation function calculating step, wherein the non-linear tensor activation function calculating step comprises executing a directional non-linear activation function on one of the convolution feature ring elements of the convolution feature ring tensor to generate an output feature ring element;

wherein the ring multiplication calculating step comprises performing a ring multiplication on one of the input feature ring elements and one of the weight ring elements to generate a multiplication output ring element, and a multiplication output component of the multiplication output ring element is obtained by performing a component-wise product on an input feature component of the one of the input feature ring elements and a weight component of the one of the weight ring elements;

wherein the ring addition calculating step comprises performing a ring addition on a plurality of the multiplication output ring elements to generate the one of the convolution feature ring elements, and a convolution feature component of each of the convolution feature ring elements is obtained by performing a component-wise addition on a plurality of the multiplication output components of the multiplication output ring elements;

wherein the deep neural network accelerating method using the plurality of ring tensors is performed to process an image without increasing input bitwidths of multiplications in the ring multiplication calculating step and to minimize complexity with the component-wise product when processing the image by the processing unit;

wherein the directional non-linear activation function comprises:

performing a first transforming step, wherein the first transforming step comprises performing a first linear transform on the one of the convolution feature ring elements to generate a first linear output ring element;

performing a normalized linear transforming step, wherein the normalized linear transforming step comprises performing the ring multiplication on the first linear output ring element and a normalized linear transform to generate a second linear output ring element;

performing a non-linear unit calculating step, wherein the non-linear unit calculating step comprises performing a component-wise non-linear unit on the second linear output ring element to generate a non-linear output ring element; and performing a second transforming step, wherein the second transforming step comprises performing a second linear transform on the non-linear output ring element to generate the output feature ring element;

wherein the first transforming step, the normalized linear transforming step, the non-linear unit calculating step and the second transforming step are performed in sequence;

wherein the deep neural network accelerating method using the plurality of ring tensors further comprises:

performing a tensor quantization step, wherein the tensor quantization step comprises performing a quantization operation on the output feature ring element to generate a quantized output ring element;

wherein after performing the tensor quantization step, the quantized output ring element generated by the tensor quantization step is regarded as the input feature ring element of the input feature ring tensor of a next layer.

* * * * *